United States Patent
Murakami (10) Patent No.: US 7,595,898 B2
(45) Date of Patent: Sep. 29, 2009

(54) PRINT CONTROL APPARATUS, PRINTER APPARATUS, INFORMATION PROCESSING APPARATUS, AND PROGRAM PRODUCT

(75) Inventor: Masahiro Murakami, Hekinan (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1001 days.

(21) Appl. No.: 10/950,467

(22) Filed: Sep. 28, 2004

(65) Prior Publication Data
US 2005/0068548 A1   Mar. 31, 2005

(30) Foreign Application Priority Data
Sep. 30, 2003   (JO)   ............... 2003-339710

(51) Int. Cl.
G06F 15/00   (2006.01)
(52) U.S. Cl. .............. 358/1.12; 358/1.2; 358/1.18; 358/448; 358/450; 358/453; 382/242; 382/243
(58) Field of Classification Search .......... 382/242, 382/243; 358/1.11, 1.2, 1.9, 1.12, 1.18, 448, 358/453, 450
See application file for complete search history.

(56) References Cited

U.S. PATENT DOCUMENTS 6,289,136 B1 *  9/2001  Oshino et al. ............ 382/298
6,507,411 B1    1/2003  Nishikawa et al.
6,970,257 B2 * 11/2005  Endo et al. ............... 358/1.1
2002/0186383 A1 12/2002 Obrador

FOREIGN PATENT DOCUMENTS

| JP | A-4-343167  | 11/1992 |
|----|-------------|---------|
| JP | A-9-193500  | 7/1997  |
| JP | 2806647     | 7/1998  |
| JP | A-11-227287 | 8/1999  |
| JP | A-2000-25277 | 1/2000 |
| JP | A-2003-8866 | 1/2003  |
| JP | A-2003-60897 | 2/2003 |

* cited by examiner

Primary Examiner—Chan S Park
(74) Attorney, Agent, or Firm—Oliff & Berridge, PLC (57) ABSTRACT

A print control apparatus is connected to a printing device, and includes: a generation unit that generates first vector data for printing an image on a single sheet and second vector data for enlarging the image and printing the enlarged image on a plurality of sheets in a divisional manner; an conversion unit that converts the first vector data and the second vector data generated by the generation unit into first bitmap data and second bitmap data, respectively; a division unit that divides the second bitmap data into units corresponding to each of the plurality of sheets; and an output control unit that outputs the first bitmap data and the divided second bitmap data to the printing device.

16 Claims, 8 Drawing Sheets

IMAGE BEFORE ENLARGEMENT   ENLARGE IN BITMAP DATA FORMAT   IMAGE AFTER ENLARGEMENT

FIG. 12

IMAGE BEFORE ENLARGEMENT   ENLARGE IN OUTLINE DATA FORMAT   IMAGE AFTER ENLARGEMENT ns to a printing device; FIGs etc.

PRINT CONTROL APPARATUS, PRINTER APPARATUS, INFORMATION PROCESSING APPARATUS, AND PROGRAM PRODUCT

BACKGROUND OF THE INVENTION

1. Field of the Invention

The present invention relates to a print control apparatus, a printer apparatus, an information processing apparatus, and a program for causing print unit to execute "poster print" wherein an image having a size larger than a size of a sheet is printed into a plurality of sheets.

2. Description of the Related Art

Hitherto, to provide printed matter having a size larger than a size of a sheet set in a printer, a print processing apparatus has been proposed which has a function of dividing a print image larger than the sheet size into a plurality of sheets. (For example, refer to Japanese Patent No. 2806647.) Such a function is generally called "poster print function," enabling the operator to combine the print sheets into one to create one large poster or panel.

The print processing apparatus disclosed in the Japanese Patent No. 2806647 can convert document data created by the operator into a print image of a size to fit on one sheet of sheet, add division lines to division portions, and print. Then, the print processing apparatus enlarges the print images in the division portions separated by the division lines and prints the enlarged print images on a plurality of sheets of sheet.

According to the above print processing apparatus, when executing the poster print, division lines are added to the whole print image for print, so that the operator is given an at-a-glance picture of where each enlarged print portion is positioned in the whole print image, and can easily combine the print sheets into one.

SUMMARY OF THE INVENTION

However, to enlarge the print images in the division portions separated by the division lines for print, the related art described above involves a problem of making coarse the image quality of the resultant printed matter.

It is one of objects of the invention to provide a print control apparatus, a printer apparatus, an information processing apparatus, and a program product, when a larger image than the size of sheet is divided into a plurality of sheets of sheet for print, for making it possible to provide a good image on each sheet of sheet.

According to a first aspect of the invention, there is provided a print control apparatus connected to a printing device, the print control apparatus including: a generation unit that generates first vector data for printing an image on a single sheet and second vector data for enlarging the image and printing the enlarged image on a plurality of sheets in a divisional manner; an conversion unit that converts the first vector data and the second vector data generated by the generation unit into first bitmap data and second bitmap data, respectively; a division unit that divides the second bitmap data into units corresponding to each of the plurality of sheets; and an output control unit that outputs the first bitmap data and the divided second bitmap data to the printing device.

According to a second aspect of the invention, there is provided a printer apparatus including: a print unit that prints an image on a sheet; a generation unit that generates first vector data for printing an image on a single sheet and second vector data for enlarging the image and printing the enlarged image on a plurality of sheets in a divisional manner; an conversion unit that converts the first vector data and the second vector data generated by the generation unit into first bitmap data and second bitmap data, respectively; a division unit that divides the second bitmap data into units corresponding to each of the plurality of sheets; and an output control unit that outputs the first bitmap data and the divided second bitmap data to the print unit.

According to a third aspect of the invention, there is provided an information processing apparatus connected to a printing device, the information processing apparatus including: an image generation unit that generates image data; a generation unit that generates, from the image data generated by the image generation unit, first vector data for printing an image on a single sheet and second vector data for enlarging the image and printing the enlarged image on a plurality of sheets in a divisional manner; an conversion unit that converts the first vector data and the second vector data generated by the generation unit into first bitmap data and second bitmap data, respectively; a division unit that divides the second bitmap data into units corresponding to each of the plurality of sheets; and an output control unit that outputs the first bitmap data and the divided second bitmap data to the printing device.

According to a fourth aspect of the invention, there is provided a program product for causing a computer that is connected to a printing device to execute procedures including: generating first vector data for printing an image on a single sheet and second vector data for enlarging the image and printing the enlarged image on a plurality of sheets in a divisional manner; converting the first vector data and the second vector data generated by the generation unit into first bitmap data and second bitmap data, respectively; dividing the second bitmap data into units corresponding to each of the plurality of sheets; and outputting the first bitmap data and the divided second bitmap data to the printing device.

BRIEF DESCRIPTION OF THE DRAWINGS

These and other objects and advantages of the present invention will become more fully apparent from the following detailed description taken with the accompanying drawings, in which.

DETAILED DESCRIPTION OF THE PREFERRED EMBODIMENTS

Referring now to the accompanying drawings, a description will be given in detail of a preferred embodiment of the invention.

To begin with, the configuration of a print system 100 according to a first embodiment of the invention will be discussed with reference to a block diagram of FIG. 1.

The print system 100 (print apparatus) according to the embodiment of the invention includes a host computer 1 and a printer 7. The host computer 1 (print control apparatus) and the printer 7 are connected by a communication cable 9.

The host computer 1 includes a CPU 10, ROM 11, RAM 12, a keyboard controller 13, a display controller 15, a hard disk controller 17, a printer controller 19, a keyboard 14, a display 16, and a hard disk 18. The printer 7 includes a CPU 70, ROM 71, RAM 72, an input section 73, a print section interface 74, a print section 75 (print unit), and an operation section 76. The CPU 10 is a central processing unit for totally controlling the devices connected to a system bus 20. The host computer 1 executes image creation processing containing text, photos, graphics, etc., based on a program stored in the ROM 11 or the hard disk 18.

Hereinafter, the components of the host computer 1 will be described in detail.

As the user enters commands with an input method such as a mouse cursor on the display 16, the CPU 10 opens various registered windows in response to the entered commands and executes data processing. When using the printer 7 to print, the user can open a window concerning print setting and can set print processing for a printer driver 50 described later.

The ROM 11 stores font data used in image creation processing, various programs executed in performing image creation processing, an operating system (OS) of the control program of the CPU 10, and the like.

The RAM 12 functions mainly as a work area used for the CPU 10 to execute various programs stored in the ROM 11.

The keyboard controller 13 controls key input through the keyboard 14. The display controller 15 controls display of the display 16. The hard disk controller 17 controls the access requested by the CPU 10 to the hard disk 18. The printer controller 19 executes communication control processing between the host computer 1 and the printer 7.

The keyboard 14 is provided with a plurality of keys. The display 16 displays text, photos and graphics. The hard disk 18 stores various data including the printer driver 50.

Hereinafter, the components of the printer 7 will be described in detail.

The CPU 70 is a central processing unit for totally controlling the devices connected to a system bus 77, and outputs an image signal as output information to the print section 75 based on a control program stored in the ROM 71. The CPU 70 can perform communication processing with the host computer 1 through the input section 73 and can send information in the printer 7 to the host computer 1.

The ROM 71 stores data such as font data used in generating output information, and the control program of the CPU 70. The RAM 72 provides a work area for the CPU 70.

The input section 73 transfers data between the printer 7 and the host computer 1. The print section interface 74 transfers data between the CPU 70 and the print section 75. The print section 75 performs print operation under the control of the CPU 70. The operation section 76 includes switches and a display device for the user to operate the printer 7.

Figure 2:
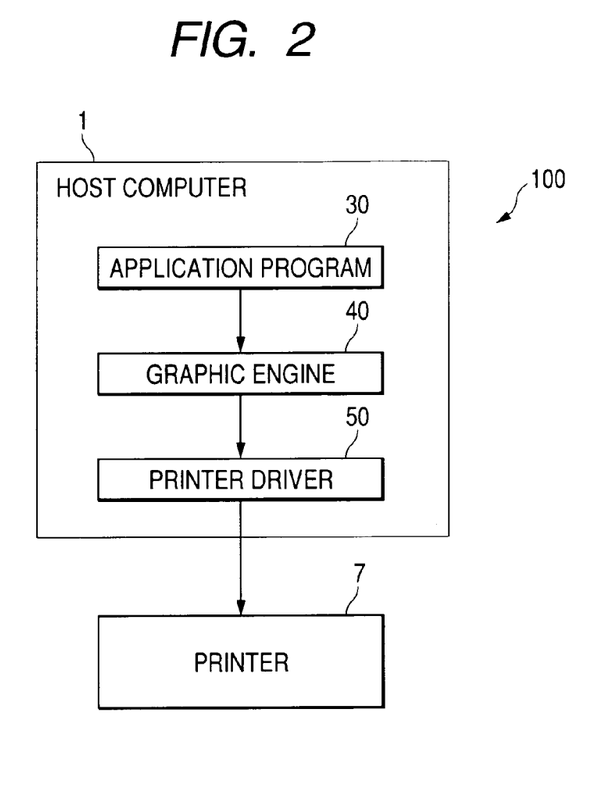
FIG. 2 is a block diagram to show the configuration of the print system 100 for typical print processing.

FIG. 2 is a block diagram to show the configuration of the print system 100 for typical print processing in the embodiment.

Figure 1:
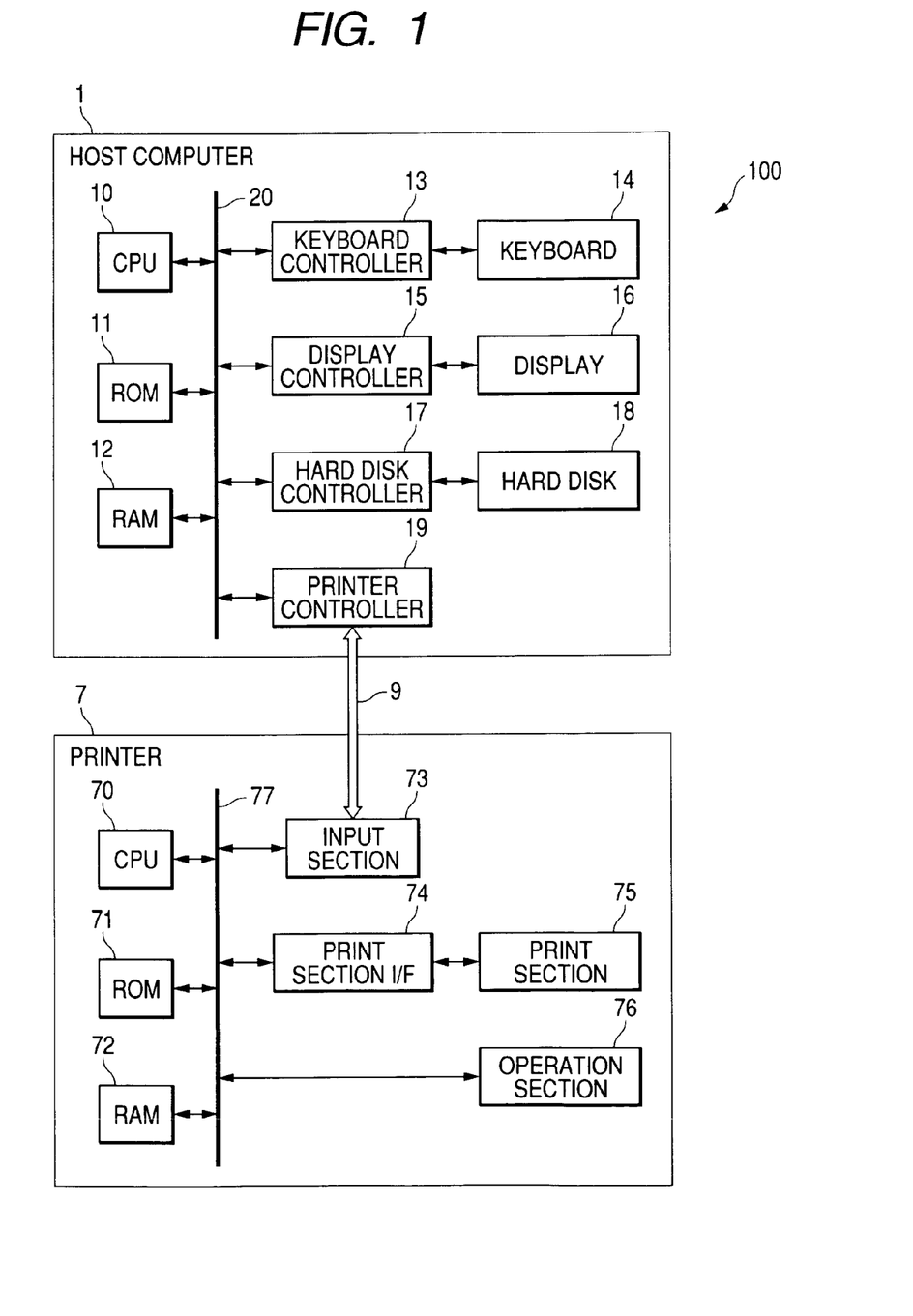
FIG. 1 is a block diagram to show the configuration of a print system 100.

In FIG. 2, an application program 30, a graphic engine 40, and the printer driver 50 are retained on the hard disk 18 in FIG. 1. The application program 30, the graphic engine 40, and the printer driver 50 are programs loaded into the RAM 12 by the OS for execution.

The application program 30 and the printer driver 50 can be added to the hard disk 18 from a floppy disk (registered trademark) or a CD-ROM. The application program 30 retained on the hard disk 18 is loaded into the RAM 12 for execution. To give a print command from the application program 30 to the printer 7, the graphic engine 40 loaded into the RAM 12 for execution is used to perform the print operation.

In print processing, the graphic engine 40 loads the printer driver 50 provided corresponding to the printer 7 into the RAM 12 from the hard disk 18, and sets output of the application program 30 in the printer driver 50. The graphic engine 40 converts a function (mathematical scheme) received from the application program 30 into a function for the printer driver 50 and outputs the function for the printer driver 50. The printer driver 50 converts the function received from the graphic engine 40 into a control command of a PDL (Page Description Language) or the like that can be recognized by the printer 7. The provided control command is output by the OS to the printer 7 via the communication cable 9.

Hereinafter, functions (features) provided by the application program 30 and the printer driver 50 will be described in detail.

Figure 3:
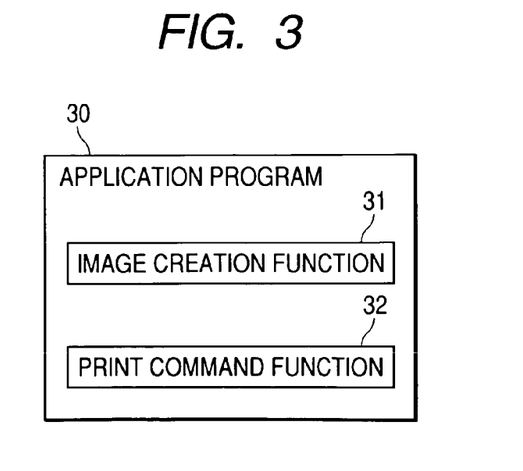
FIG. 3 is a schematic representation to show the functions provided by an application program 30 by execution of a CPU 10.

FIG. 3 is a schematic representation to show the functions provided by the application program 30 by execution of the CPU 10.

The application program 30 provides an image creation function 31 and a print command function 32.

The image creation function 31 is a function of creating image data of text, a pattern, or graphics. The user starts the application program 30, opens an image creation window on the display 16, and creates an image by the image creation function 31. Here, the image data is created as vector data representing the contours of a drawn image by coordinate values. In the embodiment, outline data is adopted as the vector data. The created image data is stored in the RAM 12.

The print command function 32 is a function of commanding the printer driver 50 to actually print the image data created by the image creation function 31 on the printer 7. The image data is printed on the printer 7 through the graphic engine 40 and the printer driver 50 according to the command of the print command function 32.

Figure 4:
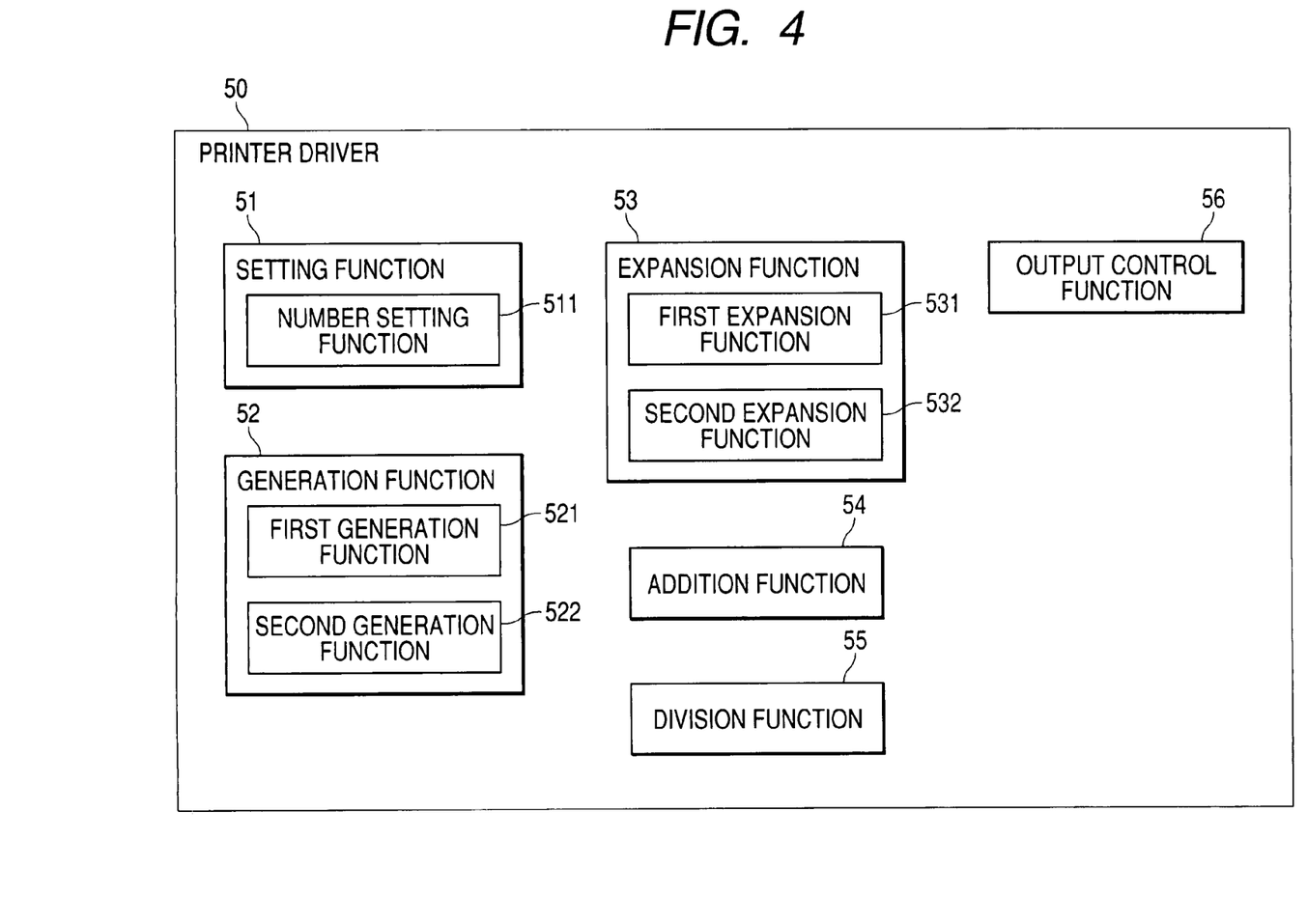
FIG. 4 is a schematic representation to show the functions provided by a printer driver 50 by execution of the CPU 10.

FIG. 4 is a schematic representation to show the functions provided by the printer driver 50 by execution of the CPU 10.

The printer driver 50 provides a setting function 51, a generation function 52 (generation unit, generation means), an conversion function 53 (conversion unit, conversion means), an addition function 54 (addition unit, addition means), a division function 55 (division unit, division means), and an output control function 56 (output control unit, output control means).

Figure 9:
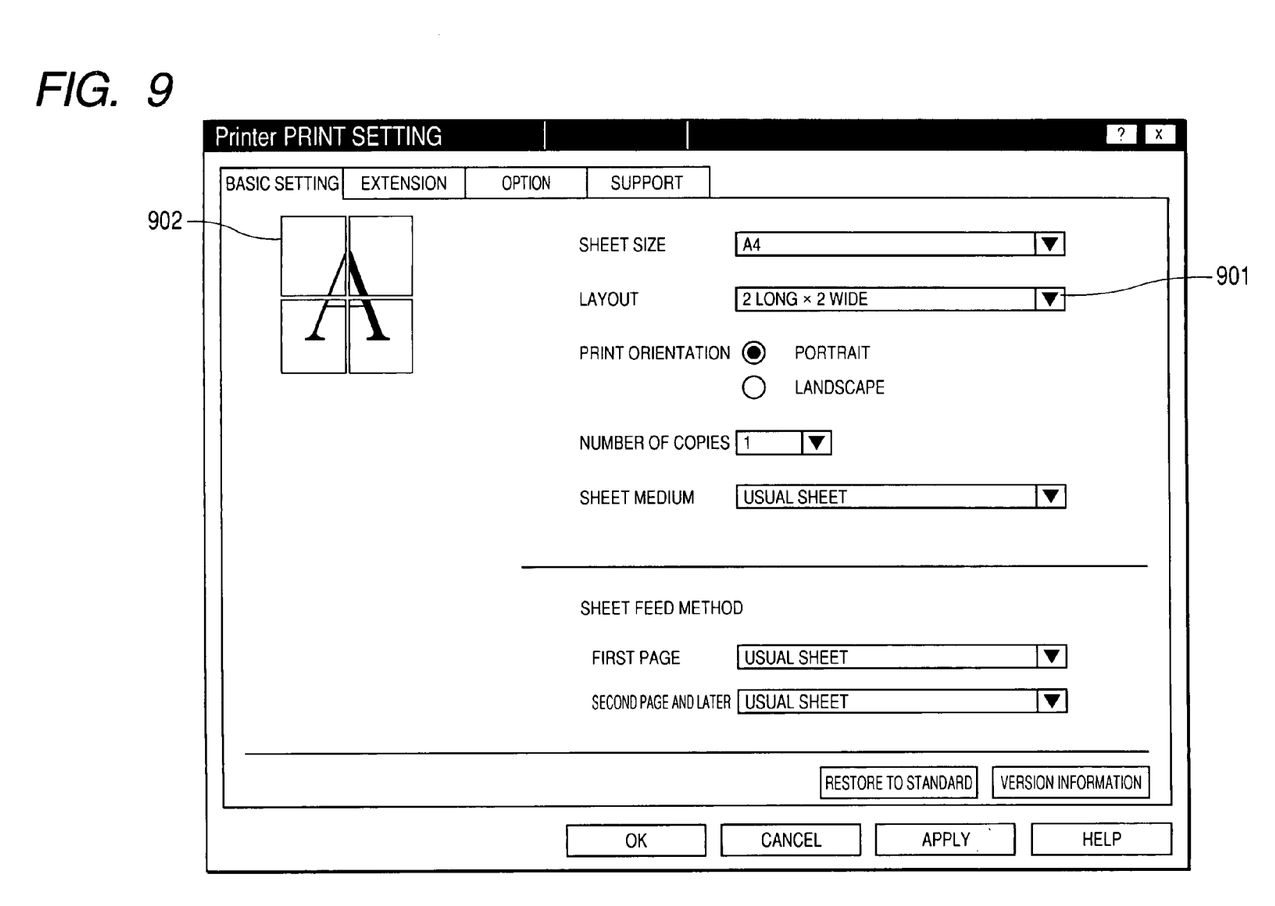
FIG. 9 is a drawing to show an example of a user interface for the user to set a print method.

The setting function 51 is a function of setting a print method to print image data supplied from the application program 30. Specifically, a user interface (UI) shown in FIG. 9 is displayed on the display 16, enabling the user to set a print method. The user interface allows the user to set the sheet size, the print orientation, the number of print copies, the sheet type, etc., as setting the print method. In the embodiment, poster print can be set. The poster print is a print method of enlarging the image to be printed on one sheet of sheet at a predetermined enlargement ratio m×m and printing the enlarged image on m×m sheets of sheet in a divisional manner. The user can combine the m×m sheets of the print result printed by the poster print into one to obtain one large printed matter. To set the poster print, the user presses a button 901 shown in FIG. 9. In FIG. 9, poster print of "2 (in longitudinal direction)×2 (in transversal direction)" with m=2 is set and the image to be printed on one sheet of sheet is doubled vertically and horizontally and is printed on four sheets of sheet.

A preview 902 of the print result from printing according to the setup print method is shown in the upper left portion of the user interface in FIG. 9. The setting function 51 in the embodiment further has a number setting function 511 (setting unit, setting means), which is a function of setting numbers on m×m sheets of sheet output when poster print is executed. The number setting function 511 enables the user to set numbers on m×m sheets of sheet displayed in the upper left portion of the user interface. The image is printed on the m×m sheets of sheet on the printer 7 in the number order set by the number setting function 511. The setting of the setting function 51 is stored in the RAM 12.

The generation function 52 has a first generation function 521 and a second generation function 522. If the user sets poster print by the setting function 51, the first generation function 521 and the second generation function 522 provide the following functions: The first generation function 521 has a function of executing coordinate conversion of image data created by the application program 30 and generating aggregate image data (first vector data) in outline data format for printing the image indicated by the image data aggregately on one sheet of sheet. The second generation function 522 has a function of enlarging the aggregate image data generated by the first generation function 521 by m times vertically and horizontally by executing coordinate conversion and generating enlarged image data (second vector data) in outline data format. In the setting example in FIG. 9, enlarged image data is generated by doubling the aggregate image data vertically and horizontally.

The conversion function 53 has a first conversion function 531 and a second conversion function 532. The first conversion function 531 has a function of executing bitmap conversion of the aggregate image data generated by the first generation function 521 to generate an aggregate image (first bitmap data). The second conversion function 532 has a function of executing bitmap conversion of the enlarged image data generated by the second generation function 522 to generate an enlarged image (second bitmap data).

Figure 10:
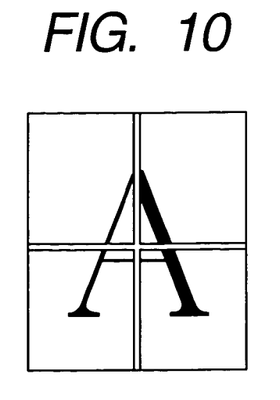
FIG. 10 is a schematic representation to show an aggregate image to which a gap image is added.

The addition function 54 has a function of adding a gap image to the aggregate image generated by the first conversion function 531. The image data created by the application program 30 is printed on m×m sheets of sheet in a divisional manner by the poster print. The addition function 54 adds a gap image to the aggregate image corresponding to the division positions. The gap image is added to the aggregate image for print, so that the user can easily check the combining positions of the sheets of sheet output by the poster print. According to the setting example in FIG. 9, the aggregate image to which the gap image is added becomes as shown in FIG. 10.

The division function 55 divides the enlarged image generated by the second conversion function 522 in units to provide m×m images. In the example in FIG. 9, "2 (in longitudinal direction)×2 (in transversal direction)" is set and therefore the enlarged image data is divided into four pieces.

The output control function 56 is a function of outputting the aggregate image to which the gap image is added by the addition function 54 and the enlarged image divided by the division function 55 to the printer 7 for print. Specifically, the aggregate image to which the gap image is added by the addition function 54 and the enlarged image divided by the division function 55 are converted into the PDL that can be interpreted by the printer 7, and the PDL is transmitted to the printer 7 via the communication cable 9. The printer 7 prints in conformity with the images.

Figure 5:
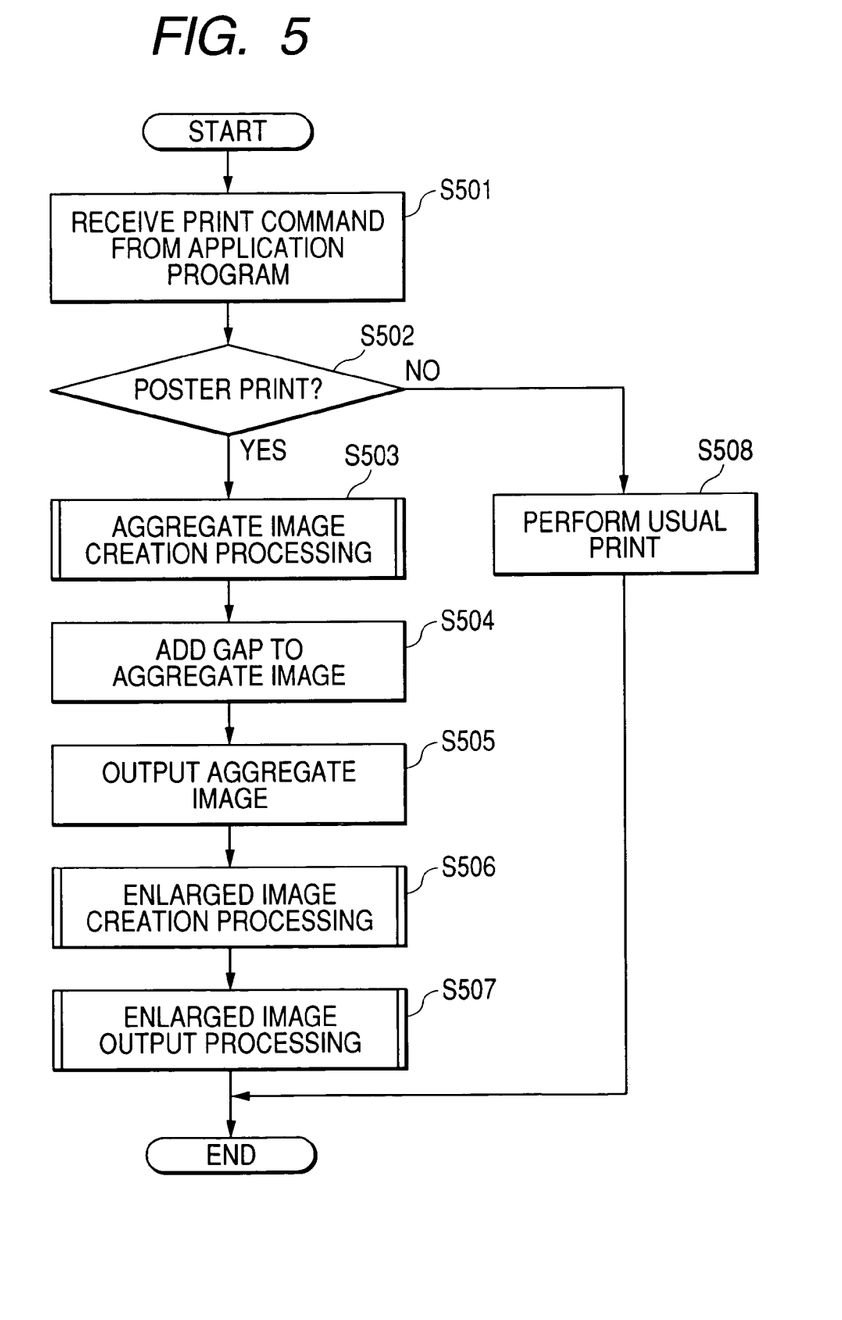
FIG. 5 is a flowchart to show the print processing operation of the print system 100.

FIG. 5 is a flowchart to show the print processing operation of the print system 100 described above. The print processing will be discussed according to the flowchart. The print processing is accomplished by the functions of the printer driver 50.

To begin with, at step 501 (S501), a print command is received from the application program 30. Then, the process proceeds to S502.

At S502, whether or not poster print is set by the setting function 51 is determined. If poster print is not set (NO at S502), the process proceeds to S508 and usual print is executed. The usual print refers to print according to a print method excluding poster print, and print is executed according to the print method set by the setting function 51. If poster print is set (YES at S502), the process proceeds to S503 and processing for executing poster print is performed.

At S503, aggregate image creation processing is performed. This aggregate image creation processing is processing of executing coordinate conversion of the image data supplied from the application program 30 to generate aggregate image data and then converting the aggregate image data into bitmap data to create an aggregate image. The aggregate image creation processing at S503 is accomplished by the first generation function 521 and the first conversion function 531, as described later in detail. After the aggregate image is created, the process proceeds to S504.

At S504, a gap image is added to the created aggregate image. In the embodiment, the image data output from the application program 30 is enlarged, divided, and printed on m×m sheets of sheet by poster print. A gap image is added to the aggregate image corresponding to the division positions as described above. S504 is executed by the addition function 54. After the gap image is added, the process proceeds to S505.

At S505, the created aggregate image is output to the printer 7. When outputting the created aggregate image to the printer 7, the created aggregate image is converted into a language that can be interpreted by the printer 7. S505 is executed by the output control function 56. After output to the printer, the process proceeds to S506.

At S506, enlarged image creation processing is performed. This enlarged image creation processing is processing of executing coordinate conversion of the aggregate image data generated at S503 to generate enlarged image data and then converting the enlarged image data into bitmap data to create an enlarged image. The enlarged image creation processing at S506 is accomplished by the second generation function 522 and the second conversion function 532, as described later in detail. After the enlarged image is created, the process proceeds to S507.

At S507, enlarged image output processing is performed. This enlarged image output processing is processing of outputting the created enlarged image to the printer 7. The enlarged image is converted into a language that can be interpreted by the printer 7 for output to the printer 7. The enlarged image output processing at S507 is executed by the output control function 56 as at S505, as described later in detail.

Figure 6:
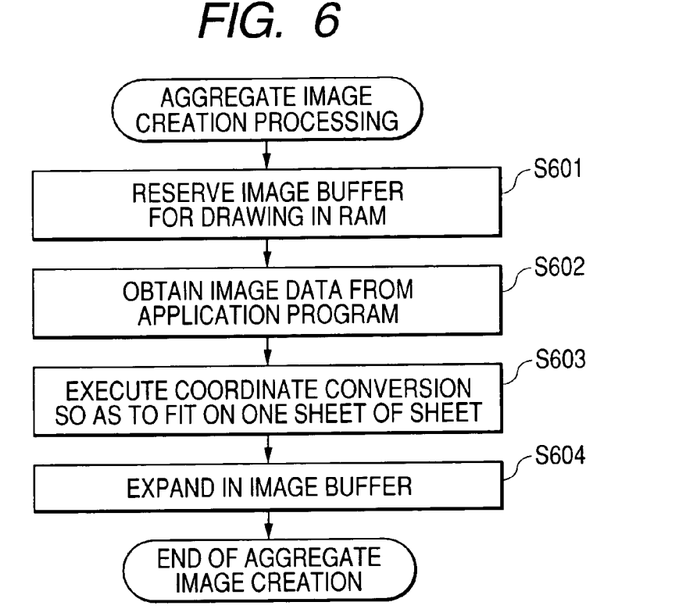
FIG. 6 is a flowchart to show a sequence of aggregate image creation processing.

Next, the aggregate image creation processing at S503 in FIG. 5 will be discussed with reference to FIG. 6. FIG. 6 is a flowchart to show a sequence of the aggregate image creation processing.

At S601, a buffer for creating an aggregate image is reserved in the RAM 12. At S601, a buffer required for converting an image of one sheet of sheet is reserved. After the buffer is reserved, the process proceeds to S602.

At S602, the image data created by the application program 30 is obtained by reading the image data stored in the buffer created in the RAM 12. After the image data is read, the process proceeds to S603.

At S603, coordinate conversion is executed into the size for printing the read image data on one sheet of sheet and aggregate image data is generated. The aggregate image data is temporarily stored in the RAM 12. After the aggregate image data is generated, the process proceeds to S604. S603 is executed by the first generation function 521.

At S604, the generated aggregate image data is converted into bitmap data to generate an aggregate image in the image buffer reserved at S601. S604 is executed by the first conversion function 531. After the aggregate image data is converted into bitmap data to generate an aggregate image, the aggregate image creation processing routine is exited.

Figure 7:
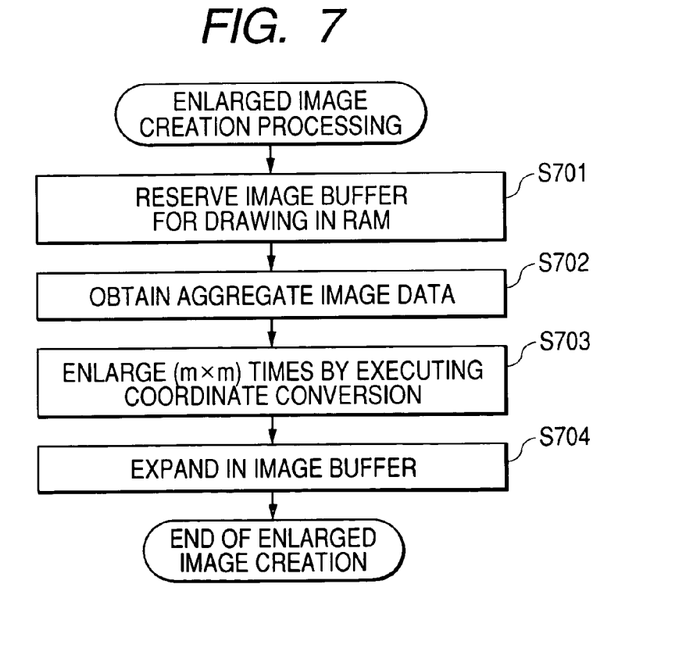
FIG. 7 is a flowchart to show a sequence of enlarged image creation processing.

Next, the enlarged image creation processing at S506 in FIG. 5 will be discussed with FIG. 7. FIG. 7 is a flowchart to show a sequence of the enlarged image creation processing.

To begin with, at S701, a buffer for creating an enlarged image is reserved in the RAM 12. At S701, a buffer required for converting images of m×m sheets of sheet is reserved. After the buffer is reserved, the process proceeds to S702.

At S702, the aggregate image data generated at S603 in FIG. 6 is read from the RAM 12. After the aggregate image data is obtained, the process proceeds to S703.

At S703, coordinate conversion of the aggregate image data is executed for enlarging the aggregate image data at enlargement ratio m×m to generate enlarged image data. S703 is executed by the second generation function 522. After the enlarged image data is provided, the process proceeds to S704.

At S704, the enlarged image data is converted into bitmap data to generate an enlarged image in the buffer reserved at S701. S704 is executed by the second conversion function 532. After the enlarged image data is converted into bitmap data to generate an enlarged image, the enlarged image creation processing routine is exited.

Figure 8:
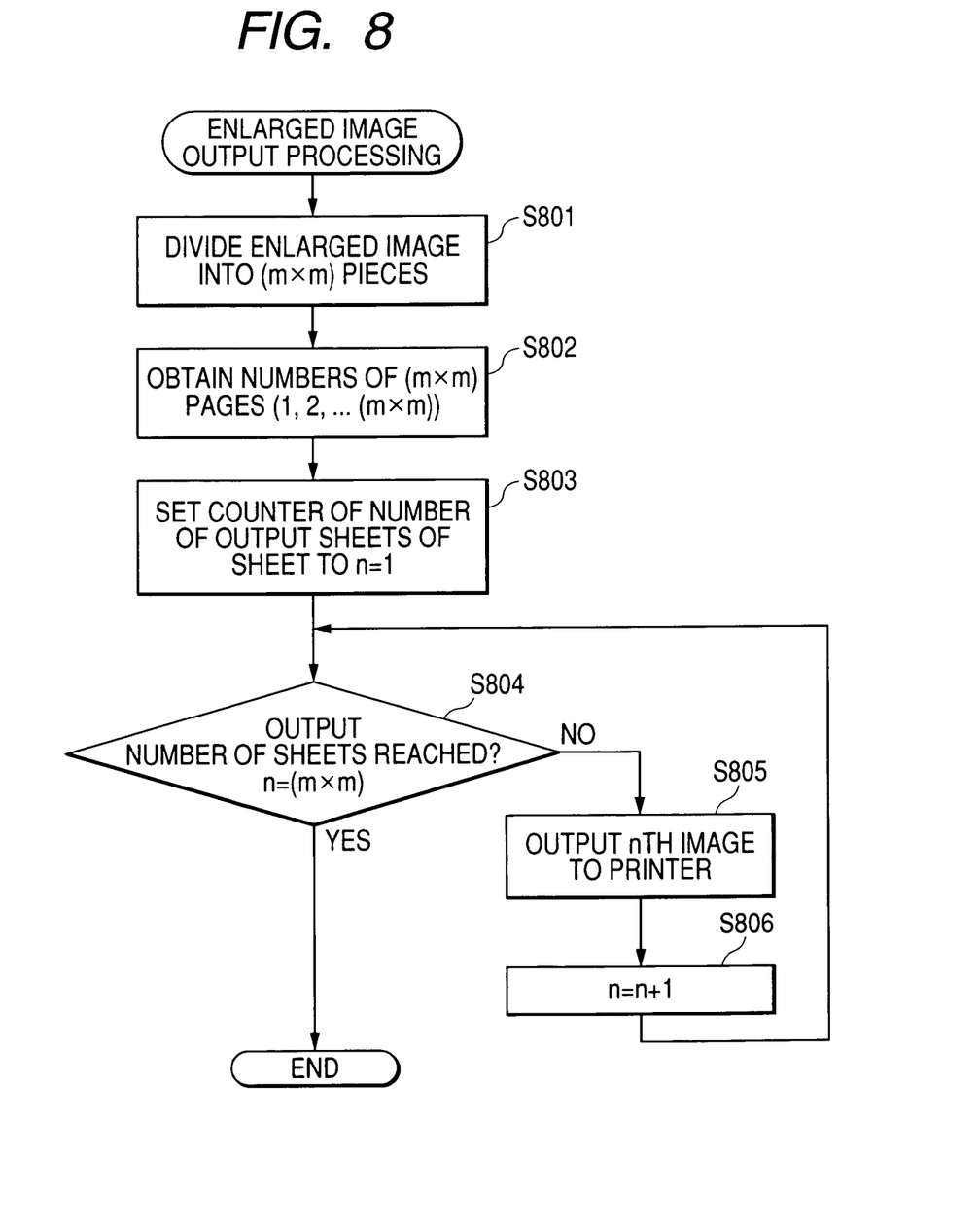
FIG. 8 is a flowchart to show a sequence of enlarged image output processing.

Next, the enlarged image output processing at S507 in FIG. 5 will be discussed with reference to FIG. 8. FIG. 8 is a flowchart to show a sequence of the enlarged image output processing.

At S801, the enlarged image is divided into m×m pieces. S801 is executed by the division function 55. After the enlarged image is divided into m×m images, the process proceeds to S802.

At S802, the numbers assigned to the division images by the number setting function 511 of the setting function 511 are read from the RAM 12. After the numbers assigned to the division images are obtained, the process proceeds to S803.

At S803, a counter is set to a value "1". After then, the process proceeds to S804.

At S804, whether or not the number of sheets of sheet output to the printer 7 reaches m×m is determined. If it is determined that the number of sheets of sheet reaches m×m (YES at S804), the enlarged image output processing routine is exited. If it is not determined that the number of sheets of sheet reaches m×m (NO at S804), the process proceeds to S805 and the image assigned the number set in the counter is output to the printer 7 from among the images to which the numbers are assigned by the number setting function 511. Then, the process proceeds to S806. At S806, the counter is incremented by one and the process proceeds to S804 and similar processing is again repeated. Thus, to execute poster print, images are printed on sheets of sheet output on the printer 7 in the order set in the number setting function 511.

According to the described configuration, the print system 100 of the embodiment can execute poster print of enlarging the image to be printed on one sheet of sheet at a predetermined enlargement ratio m×m and printing the enlarged image on m×m sheets of sheet and also prints the aggregate image on one sheet of sheet. Accordingly, the user can combine the sheets of sheet provided by the poster print into one according to one sheet of sheet of the aggregate image, and can create a poster efficiently.

To print poster print images on one aggregate image sheet of sheet, gap is added corresponding to the division positions of the poster print images. Accordingly, the user can check the combining positions of the poster print image sheets of sheet according to the gap.

Figure 11:
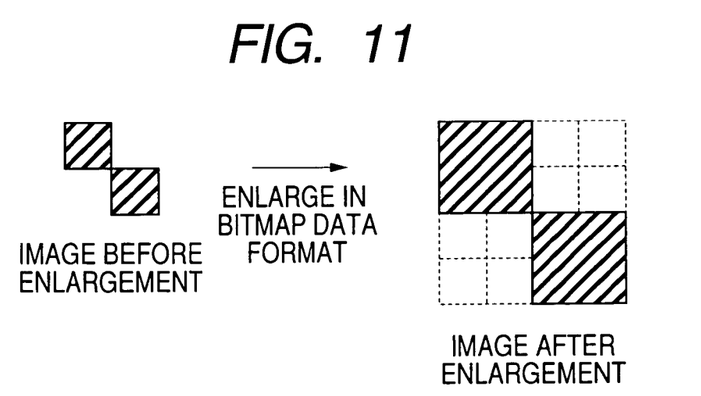
FIG. 11 is a schematic representation to show the image quality provided when enlargement processing is performed after conversion to bitmap data.
Figure 12:
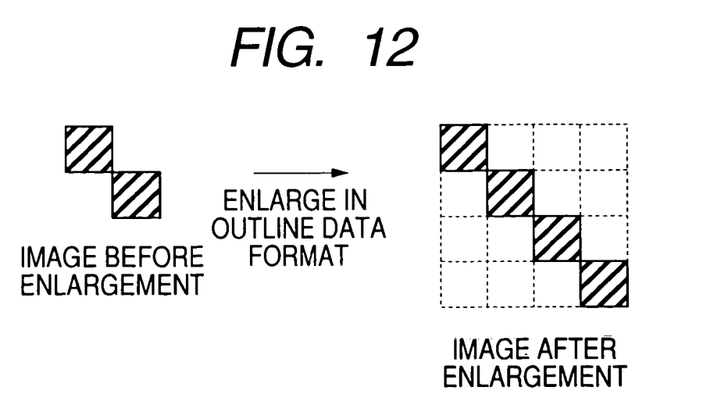
FIG. 12 is a schematic representation to show the image quality provided when enlargement processing is performed in outline data format before conversion to bitmap data.

In the embodiment, coordinate conversion of the aggregate image data to print an aggregate image on one sheet of sheet is executed for enlarging the aggregate image data m×m times and then bitmap conversion is executed to create an enlarged image for poster print. Generally, to execute poster print, if enlargement processing is performed after conversion to bitmap data, the image quality becomes coarse as shown in FIG. 11. According to the embodiment, coordinate conversion of the aggregate image data in the outline data format is executed for enlarging the aggregate image data before conversion to bitmap data, so that when poster print is executed, the image quality does not become coarse and the image quality as shown in FIG. 12 can be provided.

Although one embodiment of the invention has been described, it is to be understood that the invention is not limited to the specific embodiment thereof and that various changes and modifications may be made in the invention without departing from the spirit and scope thereof.

For example, in the embodiment described above, the enlarged image data is generated by converting the coordinate values of the aggregate image data, but may be generated directly from the image data supplied from the application program.

According to a first aspect of the invention, there is provided a print control apparatus connected to a printing device, the print control apparatus including: a generation unit that generates first vector data for printing an image on a single sheet and second vector data for enlarging the image and printing the enlarged image on a plurality of sheets in a divisional manner; an conversion unit that converts the first vector data and the second vector data generated by the generation unit into first bitmap data and second bitmap data, respectively; a division unit that divides the second bitmap data into units corresponding to each of the plurality of sheets; and an output control unit that outputs the first bitmap data and the divided second bitmap data to the printing device.

According to a second aspect of the invention, there is provided a printer apparatus including: a print unit that prints an image on a sheet; a generation unit that generates first vector data for printing an image on a single sheet and second vector data for enlarging the image and printing the enlarged image on a plurality of sheets in a divisional manner; an conversion unit that converts the first vector data and the second vector data generated by the generation unit into first bitmap data and second bitmap data, respectively; a division unit that divides the second bitmap data into units corresponding to each of the plurality of sheets; and an output control unit that outputs the first bitmap data and the divided second bitmap data to the print unit.

According to a third aspect of the invention, there is provided an information processing apparatus connected to a printing device, the information processing apparatus including: an image generation unit that generates image data; a generation unit that generates, from the image data generated by the image generation unit, first vector data for printing an image on a single sheet and second vector data for enlarging the image and printing the enlarged image on a plurality of sheets in a divisional manner; an conversion unit that converts the first vector data and the second vector data generated by the generation unit into first bitmap data and second bitmap data, respectively; a division unit that divides the second bitmap data into units corresponding to each of the plurality of sheets; and an output control unit that outputs the first bitmap data and the divided second bitmap data to the printing device.

According to a fourth aspect of the invention, there is provided a program product for causing a computer that is connected to a printing device to execute procedures including: generating first vector data for printing an image on a single sheet and second vector data for enlarging the image and printing the enlarged image on a plurality of sheets in a divisional manner; converting the first vector data and the second vector data generated by the generation unit into first bitmap data and second bitmap data, respectively; dividing the second bitmap data into units corresponding to each of the plurality of sheets; and outputting the first bitmap data and the divided second bitmap data to the printing device.

According to the configurations of first through fourth aspects of the invention, the first vector data to print an image on one sheet and the second vector data to print the image on a plurality of sheets are generated and each vector data is converted into bitmap data. The print unit (or the printing device) is caused to perform print operation in accordance with the provided bitmap data. Thus, the bitmap data is generated from the previously enlarged vector data, so that the quality of the images to be printed on a plurality of sheets can be made good as compared with the case where enlargement processing is performed for creating the images to be printed on a plurality of sheets after conversion to bitmap data.

The generation unit may be configured to generate the first vector data and the second vector data from one image data. According to this configuration, the first vector data and the second vector data are generated from one image data. Thus, separate image data to generate the first vector data and the second vector data is not required, so that the generation processing speed can be increased.

The first vector data and the second vector data may be data each representing edges of an image by coordinate values, and the generation unit may be configured to generate the second vector data by converting the first vector data.

The apparatus may further include an addition unit that adds at least one of a line and a gap to the first bitmap data at a position corresponding to a position where the second bitmap data is divided by the division unit, and the output control unit may be configured to output to the printing device the first bitmap data in which at least one of the line and the gap is added by the addition unit.

According to this configuration, a line or gap is added to the first bitmap data corresponding to the division position in dividing the second bitmap data in sheet units. Thus, the user may combine the enlarged image print sheets according to the added line or gap; the time and labor of the user can be lessened.

The apparatus may further include a setting unit that sets an order to print the plurality of sheets on which the divided second bitmap data are printed, and the output control unit may be configured to output the order to the printing device.

According to this configuration, the enlarged image sheets are printed in the setup order. Thus, the sheets are printed in any desired order of the user and are easily combined into one.

The output control unit may be configured to output the second bitmap data to the printing device after outputting the first bitmap data to the printing device and the first bitmap data being printed.

According to this configuration, to enlarge an image and print the enlarged image on a plurality of sheets in a divisional manner, the image is earlier printed on one sheet as an aggregate image. Thus, the user can recognize that the later printed matter is provided by enlarging the image and printing the enlarged image on a plurality of sheets in a divisional manner.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application program to enable one skilled in the art to utilize the invention in various embodiments and with various modifications as are suited to the particular use contemplated. It is intended that the scope of the invention be defined by the claims appended hereto, and their equivalents.

What is claimed is:

1. A print control apparatus connected to a printing device, the print control apparatus comprising:
    a generation unit that generates first vector data for printing an image on a single sheet and second vector data for enlarging the image and printing the enlarged image on a plurality of sheets in a divisional manner;
    a conversion unit that converts the first vector data and the second vector data generated by the generation unit into first bitmap data and second bitmap data, respectively;
    a division unit that divides the second bitmap data into units corresponding to each of the plurality of sheets;
    an output control unit that outputs the first bitmap data and the divided second bitmap data to the printing device; and
    a setting unit that allows a user to input an order to print the plurality of sheets on which the divided second bitmap data are printed,
    wherein the output control unit outputs the divided second bitmap data for the plurality of sheets in the order inputted through the setting unit.

2. The print control apparatus according to claim 1, wherein the generation unit generates the first vector data and the second vector data from one image data.

3. The print control apparatus according to claim 1, wherein the first vector data and the second vector data are data each representing edges of an image by coordinate values, and
    wherein the generation unit generates the second vector data by converting the first vector data.

4. The print control apparatus according to claim 1, further comprising an addition unit that adds at least one of a line and a gap to the first bitmap data at a position corresponding to a position where the second bitmap data is divided by the division unit,
wherein the output control unit outputs to the printing device the first bitmap data in which at least one of the line and the gap is added by the addition unit.

5. The print control apparatus according to claim 1, wherein the output control unit outputs the second bitmap data to the printing device after outputting the first bitmap data to the printing device and the first bitmap data being printed.

6. A printer apparatus comprising:
a print unit that prints an image on a sheet;
a generation unit that generates first vector data for printing an image on a single sheet and second vector data for enlarging the image and printing the enlarged image on a plurality of sheets in a divisional manner;
a conversion unit that converts the first vector data and the second vector data generated by the generation unit into first bitmap data and second bitmap data, respectively;
a division unit that divides the second bitmap data into units corresponding to each of the plurality of sheets;
an output control unit that outputs the first bitmap data and the divided second bitmap data to the print unit; and
a setting unit that allows a user to input an order to print the plurality of sheets on which the divided second bitmap data are printed,
wherein the output control unit outputs the divided second bitmap data for the plurality of sheets in the order inputted through the setting unit.

7. The printer apparatus according to claim 6, wherein the generation unit generates the first vector data and the second vector data from one image data.

8. The printer apparatus according to claim 6, wherein the first vector data and the second vector data are data each representing edges of an image by coordinate values, and
wherein the generation unit generates the second vector data by converting the first vector data.

9. The printer apparatus according to claim 6, further comprising an addition unit that adds at least one of a line and a gap to the first bitmap data at a position corresponding to a position where the second bitmap data is divided by the division unit, and
wherein the output control unit outputs to the print unit the first bitmap data in which at least one of the line and the gap is added by the addition unit.

10. The printer apparatus according to claim 6, wherein the output control unit outputs the second bitmap data to the print unit after outputting the first bitmap data to the print unit and the first bitmap data being printed.

11. An information processing apparatus connected to a printing device, the information processing apparatus comprising:
an image generation unit that generates image data;
a generation unit that generates, from the image data generated by the image generation unit, first vector data for printing an image on a single sheet and second vector data for enlarging the image and printing the enlarged image on a plurality of sheets in a divisional manner;
a conversion unit that converts the first vector data and the second vector data generated by the generation unit into first bitmap data and second bitmap data, respectively;
a division unit that divides the second bitmap data into units corresponding to each of the plurality of sheets;
an output control unit that outputs the first bitmap data and the divided second bitmap data to the printing device; and
a setting unit that allows a user to input an order to print the plurality of sheets on which the divided second bitmap data are printed,
wherein the output control unit outputs the divided second bitmap data for the plurality of sheets in the order inputted through the setting unit.

12. The information processing apparatus according to claim 11, wherein the generation unit generates the first vector data and the second vector data from one image data generated by the image generation unit.

13. The information processing apparatus according to claim 11, wherein the first vector data and the second vector data are data each representing edges of an image by coordinate values, and
wherein the generation unit generates the second vector data by converting the first vector data.

14. The information processing apparatus according to claim 11, further comprising an addition unit that adds at least one of a line and a gap to the first bitmap data at a position corresponding to a position where the second bitmap data is divided by the division unit, and
wherein the output control unit outputs to the printing device the first bitmap data in which at least one of the line and the gap is added by the addition unit.

15. The information processing apparatus according to claim 11, wherein the output control unit outputs the second bitmap data to the printing device after outputting the first bitmap data to the printing device and the first bitmap data being printed.

16. A computer-readable medium encoded with a computer program for causing a computer that is connected to a printing device to execute procedures including:
generating first vector data for printing an image on a single sheet and second vector data for enlarging the image and printing the enlarged image on a plurality of sheets in a divisional manner;
converting the first vector data and the second vector data generated by the generation unit into first bitmap data and second bitmap data, respectively;
dividing the second bitmap data into units corresponding to each of the plurality of sheets;
outputting the first bitmap data and the divided second bitmap data to the printing device; and
allowing a user to input an order to print the plurality of sheets on which the divided second bitmap data are printed,
wherein the outputting outputs the divided second bitmap data for the plurality of sheets in the order.

* * * * *